United States Patent Office 2,908,657
Patented Oct. 13, 1959

2,908,657

METHOD OF PREPARING POLYURETHANE STARCH REACTION PRODUCTS AND PRODUCT THEREOF

Fitzhugh W. Boggs, Upper Montclair, N.J., assignor to United States Rubber Company, New York, N.Y., a corporation of New Jersey No Drawing. Application September 15, 1954
Serial No. 456,320

6 Claims. (Cl. 260—9)

This invention relates to an improved composition of matter and more particularly to a cured mixture of a synthetic elastomeric polyurethane polymer (by which is meant an elastomeric, polymeric, cross-linked, chain-extended, diisocyanate-modified polyester or polyester-amide) and starch and to a method of making same.

Elastomeric synthetic polyurethane polymers have recently become important as new rubbery materials. Such elastomeric synthetic polymers are described in detail in an article by O. Bayer et al. which appeared in Rubber Chemistry and Technology, volume 23, pages 812–835 (1950). As is now well known, the elastomeric or rubbery synthetic polyurethanes are elastic materials capable, when cured, of being extended to more than 200% of their original length and of returning rapidly to approximately their original length. They are made from three reactants, viz.; (1) dried linear polyesters or polyester-amides, or mixtures thereof; (2) organic polyisocyanates; and (3) initiators of cross-linking. The linear polyesters or polyester-amides employed contain hydroxyl groups or other groups having active hydrogen, such as amino or amide groups. Suitable polyesters are disclosed in the Bayer et al. article referred to above, particularly in Tabel 2 on page 819, and they are typified by the polyesters derived from glycols of the formula HO—R—OH, wherein R is an aliphatic divalent hydrocarbon group containing from 2 to 6 carbon atoms, and acids of the formula

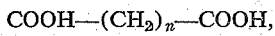

COOH—(CH$_2$)$_n$—COOH, wherein $n$ is an integer within the range from 2 to 10.

As an example of the preparation of such polyesters, adipic acid may be reacted with ethylene glycol to produce a polyester having hydroxyl groups at each end of the molecule. The individual polyester molecules may then be joined by drying the polyester and reacting the terminal alcoholic hydroxyl groups with a suitable diisocyanate, such as p,p′-diphenylmethane diisocyanate. If the proper amount of diisocyanate is used, the diisocyanate-modified polyester will have terminal isocyanate groups. Subsequent reaction of the diisocyanate-modified polyester with water or the like in relatively small amounts brings about linear urea bridging at the terminal groups. Final cross-linking, in which the urea bridges react with other terminal isocyanate groups, is brought about by heat, giving a highly cross-linked product.

In greater particularity, many of the elastomeric synthetic polyurethane polymers are made by (1) preparing a linear polyester from a glycol or mixture thereof, for example, a mixture of ethylene and propylene glycols, and an aliphatic saturated dicarboxylic acid, for example adipic acid, using an excess of glycol over the acid so that the resulting linear polyester contains terminal alcoholic hydroxyl groups (usually using an amount of glycol sufficient to give the polyester a hydroxyl number of 20–120, preferably 40–80, and an acid value of less than 2) drying this polyester and (2) mixing this linear polyester with a diisocyanate, for example naphthalene-1,5 diisocyanate or p,p′-diphenylmethane diisocyanate, using a considerable excess—commonly from 20 to 250% and preferably from 50 to 100%—of the diisocyanate over the theoretical amount corresponding to the alcoholic hydroxyl groups furnished by the polyester, then interacting the polyester and the diisocyanate under anhydrous conditions at an elevated temperature, e.g., 70–150° C., to form a liquid material which is a linear polyurethane having terminal isocyanate groups; and (3) reacting this liquid, diisocyanate-modified polyester with a small amount of water, typically about 0.5 to 0.95 mole per mole of the liquid reaction product, to convert it to a "gum."

The "gum" is then cured, i.e., it is converted to a form resembling vulcanized Hevea rubber, by the application of heat and pressure for a suitable period of time (10 minutes to 2 hours). The water reacts with a portion only of the isocyanate groups present, converting them to —NH$_2$ groups which react immediately with other isocyanate groups, thus forming urea bridges which in turn react with remaining isocyanate groups, giving a highly cross-linked product.

Instead of water as the material used to initiate the curing mechanism, other chemicals such as trihydric and higher polyhydric alcohols, beta-aminoethyl alcohol, and polyamines such as diamines can be used.

Other commercially important synthetic elastomeric polyurethane polymers are made in the same way except that the polyester is replaced with a polyester-amide, such as one made by esterifying a glycol with an aliphatic saturated dicarboxylic acid in the presence of an amino alcohol, e.g., an alkanolamine, or a diamine such as an alkylene diamine.

In some cases the synthetic elastomeric polyurethane polymer is made by reacting together in a suitable fashion (1) a polyester or polyester-amide, (2) a bifunctional compound such as a diamine, and (3) a diisocyanate such as naphthalene-1,5 diisocyanate or p,p′-diphenylmethane diisocyanate, to give an uncured elastomeric product, and effecting a cure of this product by intimately mixing therewith an organic polyisocyanate, generally a diisocyanate identical with that previously employed, in sufficient amount to effect the desired cure, and subjecting the resulting mixture to heat and pressure.

One of the principal objects of the present invention is to provide a filler for such polyurethane polymers as described above, which filler becomes chemically combined with the polymer and which lessens the cost of the finished product. Another object is to provide an uncured mixture which, unlike the aforementioned unfilled mixtures, is in the form of a paste that readily lends itself to handling and molding. A further object is to provide a material which when cured resembles leather in appearance and physical properties. Numerous other objects of the present invention will hereinafter appear.

I have discovered that starch, when introduced into a diisocyanate-modified polyester in the manner hereinafter described, plays a dual role of being both a filler and a cross-linking agent that becomes chemically combined with the polyurethane polymer by reaction therewith of its hydroxyl groups.

In the typical practice of my invention I incorporate the starch into a previously prepared, substantially completely reacted liquid reaction product of a dried polyester prepared in the manner described above and a diisocyanate. The starch and the liquid reaction product are intimately mixed together and subjected to such conditions of heat and pressure as to effect reaction between the starch and diisocyanate-modified polyester product. The temperatures at which the admixing and the reaction of the starch are effected range from room temperature (when the reaction is slow) to the temperature at which the reaction mixture begins to scorch, viz., 180° C. The mixing is usually continued throughout the period of reaction with the starch. However, if desired, mixing may be discontinued immediately upon obtaining a uniform mixture, after which the mixture may be allowed to stand until sufficient reaction has occurred to bring the mixture to the desired consistency for molding and curing.

The mixing time required to obtain a good mixing of the starch with the diisocyanate-modified polyester will vary, depending upon the starch loading desired and upon the temperature at which the mixing is undertaken. A high loading and low temperature would, of course, increase the mixing time.

In general, however, the mixing time necessary to uniformly disperse the starch will vary from 10 to 30 minutes. Usually this period of mixing will be sufficient to convert the reaction mixture to a paste-like consistency in which it can be readily shaped, e.g., injection molded, and cured under heat and pressure.

In some cases, after the aforementioned uniform mixture of starch and diisocyanate-modified polyester has been obtained, I incorporate additional diisocyanate and continue mixing until a uniform mixture is again obtained; shaping and curing are then performed in the usual manner. The additional diisocyanate is thought to react solely with the starch filler and thereby produce a harder product. A small amount of water is often incorporated along with the additional diisocyanate. The water tends to accelerate the formation of the harder product.

The mole ratio of total diisocyanate to polyester must be at least 2:1 and is preferably at least 3:1, and can range upwards to any desired figure. Usually however, it is not economic to use a mole ratio above 6:1. When the diisocyanate is incorporated in two stages—partially in the diisocyanate-modified polyester only and partially after dispersion of the starch therein—I have attained the best results for my purposes by reacting initially from 2 to 2.5 moles of the diisocyanate with one mole of polyester, and thereafter admixing the starch, and incorporating additional diisocyanate in amount sufficient to bring the mole ratio of diisocyanate to polyester to at least 3:1.

In the embodiment wherein water and additional diisocyanate are added to the uniform mixture of starch and diisocyanate-modified polyester, the amount of water so introduced typically ranges from 1:1 to 2:1 in terms of mole ratio of water to polyester, and the amount of additional diisocyanate is that sufficient to bring the mole ratio of total diisocyanate to polyester to at least 3:1. As will be noted in the examples which follow, the difference in hardness obtained by adding the diisocyanate in two stages rather than in one, and with or without the addition of water, is very slight.

The order of incorporating the ingredients is critical. It is essential that the polyester and the diisocyanate be mixed and completely interacted before the starch is incorporated, unless a special mixing method such as that described and claimed in the co-pending application of Henry R. Varvaro, Serial No. 456,321, filed of even date herewith, is employed. With ordinary stirring or kneading equipment or any mixing equipment other than those employed by Varvaro, if the starch is added to the polyester before the diisocyanate, or to a mixture of polyester and diisocyanate before substantially all of the diisocyanate has reacted with the polyester, a very poor stock results having low tear resistance, low tensile strength and being non-homogeneous in appearance.

The amount of starch used preferably is not more than 150 parts per 100 parts of diisocyanate-modified polyester (including any additional diisocyanate incorporated prior to curing).

The following examples more fully illustrate my invention. All parts referred to herein are by weight. The liquid polyester referred to in these examples had a molecular weight of about 1,950, a hydroxyl value of about 50 and an acid value below 2, and was made by the reaction of 411 parts of adipic acid with 171 parts of ethylene glycol and 90 parts of propylene glycol. The polyester was reacted with p,p'-diphenylmethane diisocyanate in accordance with the following examples.

*Example I*

Ninety-five parts of a diisocyanate-modified polyester in which the ratio of diisocyanate to polyester was 2:1 (19.4 parts of diisocyanate to 75.6 parts of polyester) were placed in a Braebender Plastograph mixer together with 55 parts of culinary grade corn starch (about 58 parts of starch per 100 parts of modified polyester). These materials were mixed for 20 minutes at 90° C., at the end of which time the mixture had set up to a thick paste. This paste was removed from the mixer and sheeted out on a rubber mill preparatory to molding. It was then molded for two hours at 130° C. The resulting compound appeared leathery, yet had some of the elasticity of rubber. It had a tensile strength of 1500 p.s.i., a tear resistance of 13.7 pounds (rectilinear tear test on a sample 0.10 inch thick) and a modulus at 100% elongation of 780 p.s.i. The torsional hysteresis was 0.14.

*Example II*

Forty-two parts of the polyester were mixed with 11 parts of p,p'-diphenylmethane diisocyanate in a Braebender Plastograph at 100° for 1.5 hours (mole ratio of diisocyanate to polyester, 2:1). Thereupon 65 parts of wheat starch were added and mixing was continued for 20 minutes more at 100° C., at the end of which time 7 parts more of the diisocyanate were added along with a small amount of Mapico brown coloring. The additional diisocyanate raised the mole ratio of diisocyanate to polyester to about 3.3:1. Mixing was continued until the additional diisocyanate and the Mapico brown were thoroughly dispersed. The pasty mixture was then removed from the mixer and a sample was press-cured for two hours at 130° C. Upon removal from the mold after curing, the product resembled leather in appearance and texture. It had a tensile strength of 1280 p.s.i., and a modulus at 100% elongation of 128 p.s.i. The paste-like consistency of the reactants before curing makes the mixture especially adaptable to injection molding, and the material is of great value in the preparation of articles made of leather-like materials, for instance shoes, handbags, etc.

*Example III*

Various starches may be used for the curing reaction of these synthetic polymers. To show the differences one may expect from incorporating different starches, two stocks were prepared according to the following formulation.

|  | A | B |
| --- | --- | --- |
| Polyester | 61 | 61 |
| p,p'-Diphenylmethane diisocyanate | 25 | 25 |
| Corn starch | 44 |  |
| Rice starch |  | 44 |

In preparing each stock, 61 parts of the polyester and 18 parts of the diisocyanate were first mixed in a Braebender Plastograph mixer for one hour at 100° C., in order to react substantially all of the diisocyanate with the polyester. The starch was then added and the resulting mixture mixed until it became pasty (indicated by a reading of ca. 500–1,000 on the Braebender Plastograph). At this point 7 parts of additional diisocyanate and 1 part of water were added. The mole ratio of total diisocyanate to polyester was 3.24:1. After the additional diisocyanate and water had been thoroughly dispersed in it the mixture was removed from the mixer, sheeted out on a cold mill and press-cured one hour at 130° C. The physical properties of the cured stocks A and B were as follows:

| Stock | Modulus, 100% Elongation | Tensile | Percent Elongation at Break | Tear |
|---|---|---|---|---|
| A | 1,000 | 1,900 | 429 | 34.2 |
| B | 1,550 | 2,050 | 200 | 23.2 |

Instead of proceeding as just described, all of the diisocyanate may be added initially as I have noted before. The step of adding further diisocyanate after the starch has been added and reacted is not absolutely essential, but it is preferred when a harder stock is desired.

Lowering the mole ratio of total diisocyanate to polyester much below 3:1 causes a decrease in tear strength and modulus. Thus, when, instead of the mole ratio of 3.24:1 used in the stocks in Example III, a mole ratio of 2:1 as in Example I is used to make a similar stock in accordance with my invention, the resulting material has a modulus at 100% elongation of only 780 p.s.i. and a tear strength of only 13.7 pounds.

*Example IV*

Extremely high loadings of starch may be used to get materials that closely resemble "gum plastics." The following formulation was used.

|  | Parts |
|---|---|
| Polyester | 20 |
| p,p'-Diphenylmethane diisocyanate | 14 |
| Wheat starch | 50 |

All of the polyester was first mixed with all of the diisocyanate for 1½ hours at 110° C. on a Braebender Mixer, thereby effecting reaction of substantially all of the diisocyanate with the polyester. The wheat starch was then added and mixing was continued until the reaction mixture reached a paste-like consistency. The pasty mass was then sheeted out on a cold rubber mill. The sheeted stock was then press-cured for 1 hour at 130° C. The cured product was a tough material closely resembling a blend of 70 parts of a styrene-acrylonitrile resinous copolymer and 30 parts of a butadiene-acrylonitrile rubbery copolymer made in accordance with U.S. Patent 2,439,202. The cured product had an impact strength of 1.2 foot-pounds.

*Example V*

When starch is added to the mixture of polyester and diisocyanate before substantially all of the diisocyanate has been reacted with the polyester, a very poor product results. This is demonstrated by the following experiment:

Seventy-one parts of the polyester, 17.9 parts of p,p'-diphenylmethane diisocyanate and 44 parts of wheat starch were mixed together in a Braebender Plastograph for 1 hour at about 100° C., resulting in the formation of a homogeneous, pasty mass. This material was removed and divided into two parts. One-half was immediately press-cured for 1 hour at 130° C. The other half was further mixed for 30 minutes on a cold mill, and then press-cured for 1 hour at 130° C. The longer-milled portion gave the better product of the two but it was still a very poor stock, as indicated by its tensile strength of only 250 p.s.i. The other stock was too poor to test.

Any kind of starch can be used in the practice of my invention. Examples are wheat starch, corn starch, rice starch, potato starch, tapioca starch, etc.

From the foregoing description many unique features and advantages of my invention are apparent to those skilled in the art. By means of my invention it is possible to use the same material, viz., starch, in the dual role of filler and cross-linking reactant for converting the diisocyanate-modified polyester to a paste and finally to cured stocks that, depending upon the amount of starch used, will range in appearance and properties from a very rubbery material to a leathery material or to a hard, boardy material of good impact strength and resembling closely some of the "gum plastics." The paste-like consistency of the uncured mixtures is a unique feature of the use of starch which makes the mixtures readily adaptable to shaping and molding, and particularly to injection molding. The gum-like mass formed before curing when water, following prior practice, is used, instead of starch, is very difficult to shape and mold. Some other advantages of the starch mixture lie in its ease of milling and its low shrinkage under processing. Because of the extremely low cost of starch and the relatively high loadings possible with starch, a product of lower cost than the water-cured product can be obtained. The starch-filled stocks, when cured, exhibit a higher tear resistance and a higher modulus than the water-cured starches. The cured starch-filled stocks are readily adaptable for use in place of leather in making such articles as shoes, valises, brief-cases, pocket books, etc.

Having thus described my invention, what I claim and desire to protect by Letters Patent is:

1. The method which comprises providing a substantially completely reacted, liquid diisocyanate-modified polyester containing terminal isocyanate groups, said diisocyanate-modified polyester having been made by reacting a linear polyester made from an excess of a glycol of the formula HO—R—OH, wherein R is an aliphatic divalent hydrocarbon group containing from 2 to 6 carbon atoms and an aliphatic saturated dicarboxylic acid of the formula COOH—$(CH_2)_n$—COOH wherein $n$ is an integer within the range from 2 to 10, the said polyester containing terminal alcoholic hydroxyl groups and having a hydroxyl number of from 20 to 120 and an acid value of less than 2, under anhydrous conditions at a temperature of from 70 to 150° C. with an organic diisocyanate in from 20% to 250% excess of the amount theoretically required to react with all of the hydroxyl groups in the polyester, intimately mixing said substantially completely reacted, liquid diisocyanate-modified polyester with starch in amount of from 58 to 150 parts of starch per 100 parts of said modified polyester at a temperature between room temperature and 180° C., and curing the resulting mixture under heat and pressure.

2. The product of the method of claim 1.

3. A method as in claim 1, in which the said organic diisocyanate is an aromatic diisocyanate.

4. A method as in claim 1, in which the said organic diisocyanate is p,p'-diphenylmethane diisocyanate.

5. A method as in claim 1, in which the said polyester is ethylene-propylene adipate.

6. A method as in claim 1, in which the said polyester is ethylene-propylene adipate and the said organic diisocyanate is p,p'-diphenylmethane diisocyanate.

References Cited in the file of this patent

UNITED STATES PATENTS

| 2,284,896 | Hanford et al. | June 2, 1942 |
| 2,303,773 | Thackston | Dec. 1, 1942 |
| 2,333,639 | Christ et al. | Nov. 9, 1943 |
| 2,374,136 | Rothrock | Apr. 17, 1945 |
| 2,430,479 | Pratt et al. | Nov. 11, 1947 |
| 2,591,884 | Simon et al. | Apr. 8, 1952 |
| 2,751,363 | Martin | June 19, 1956 |